United States Patent [19]

Duksa

[11] Patent Number: 5,661,238
[45] Date of Patent: *Aug. 26, 1997

[54] BI-STABLE LIQUID INDICATOR

[76] Inventor: Thomas Duksa, 343 East St., Wolcott, Conn. 06716

[*] Notice: The term of this patent shall not extend beyond the expiration date of Pat. No. 5,425,271.

[21] Appl. No.: 650,333

[22] Filed: May 20, 1996

[51] Int. Cl.⁶ .................................................. G01F 23/38
[52] U.S. Cl. ........................................ 73/317; 116/229
[58] Field of Search ........................ 73/314, 317, 319, 73/DIG. 5; 116/204, 229; 340/618, 623–625

[56] References Cited

U.S. PATENT DOCUMENTS

| | | | |
|---|---|---|---|
| 1,040,127 | 10/1912 | Bonesteel | 73/319 |
| 1,115,712 | 11/1914 | Miller | 340/625 |
| 2,920,484 | 1/1960 | Reichert | 73/319 |
| 3,420,103 | 1/1969 | Peschek | 73/319 |
| 3,820,098 | 6/1974 | Demyon et al. | 340/625 |
| 3,934,103 | 1/1976 | Walstra | 340/625 |
| 3,964,312 | 6/1976 | Sebek | 73/319 |
| 4,512,190 | 4/1985 | Sledmere | 73/319 |
| 5,425,271 | 6/1995 | Duksa | 73/317 |

FOREIGN PATENT DOCUMENTS 2227153  12/1973  Germany ........................ 116/204

Primary Examiner—William A. Cuchlinski, Jr.
Assistant Examiner—Andrew Hirshfeld
Attorney, Agent, or Firm—Chilton, Alix & Van Kirk

[57] ABSTRACT

A bistable liquid level indicator has a rotatable, indicia bearing member which is balanced to assume a first position under the influence of gravity. A rotatable fluid responsive actuator is magnetically coupled to the indicia bearing member such that a magnetic force, which varies as a function of the fluid induced position of the actuator, is imposed on the indicia bearing member. At a critical level of the fluid, the imposed magnetic force overcomes the gravitational force and the indicia bearing member moves to a second position.

11 Claims, 3 Drawing Sheets

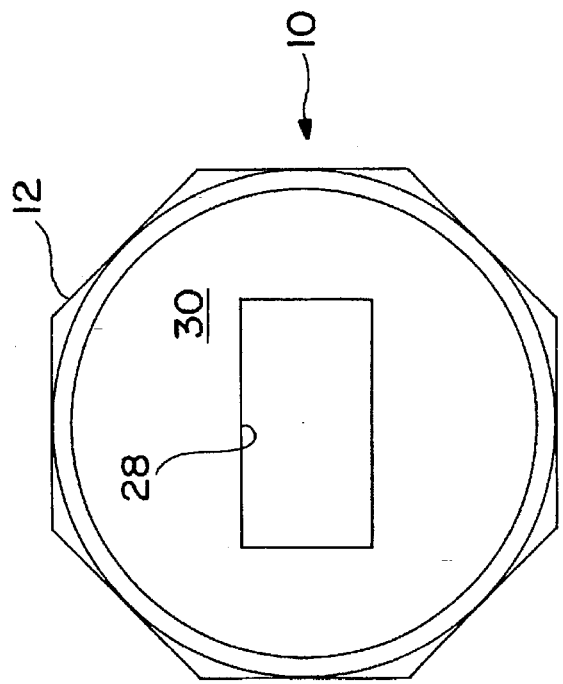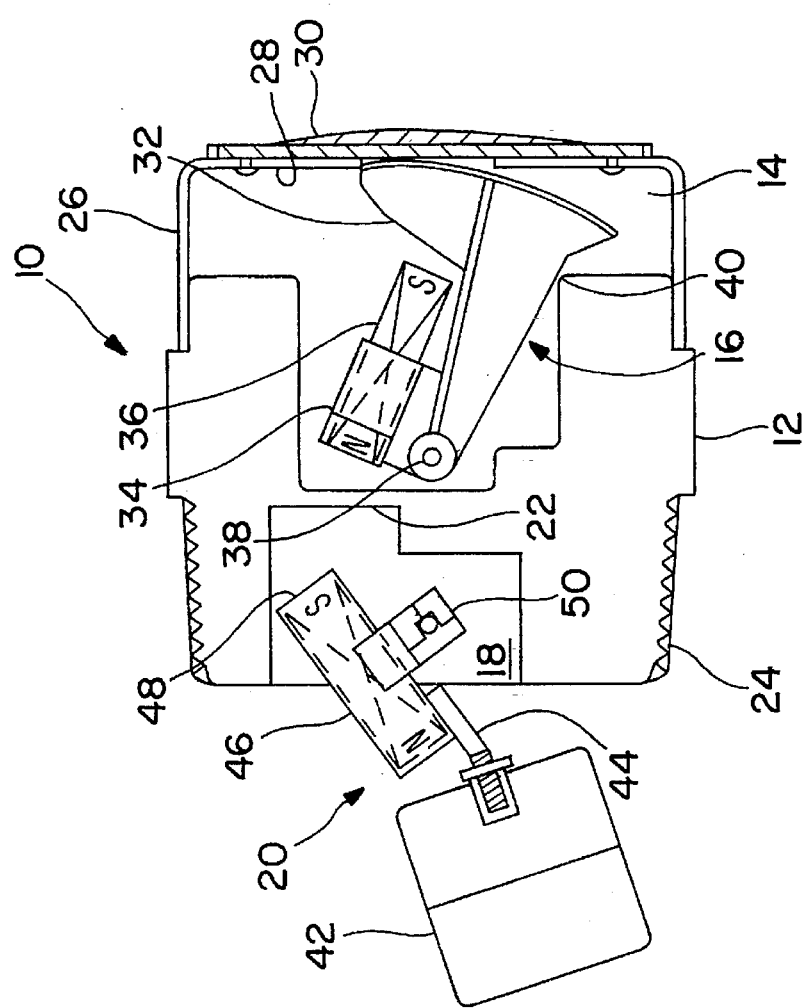

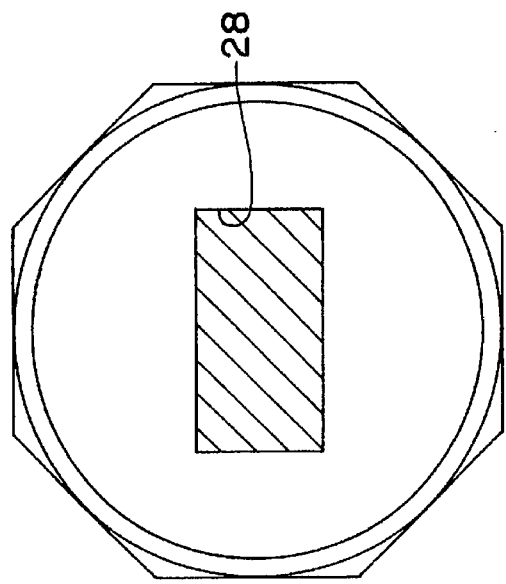
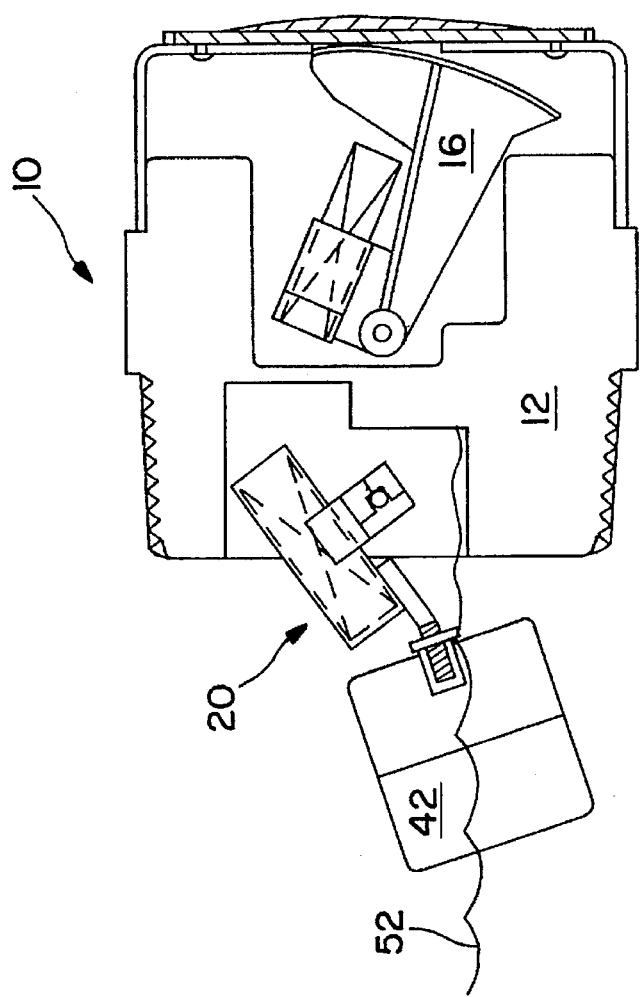

BI-STABLE LIQUID INDICATOR

BACKGROUND OF THE INVENTION

1. Field of the Invention

The present invention relates to sensing when a fluid in a reservoir reaches a critical level and, particularly, to the provision of an unambiguous fail-safe liquid level warning. More specifically, this invention is directed to a bi-stable liquid level warning device of reliable construction which is characterized by ease of installation and the provision of an easily interpreted read-out. Accordingly, the general objects of the present invention are to provide novel and improved methods and apparatus of such character.

2. Description of the Prior Art

A prior art liquid level warning device suitable for the same operating environments as the present invention is shown in U.S. Pat. Np. 5,425,271. The description of the prior art from U.S. Pat. No. 5,415,271 is incorporated herein by reference.

While the indicator of above-referenced U.S. Pat. No. 5,425,271 has enjoyed commercial success, there has remained a need for a level indicator which is characterized by bi-stable operation. Thus, in the device of U.S. Pat. No. 5,425,271, changes in the level of the liquid being monitored will result in rotation of the "flag" which provides the visual indication of liquid level. This rotation results from magnetic coupling between a pivotal member which is immersed in the liquid being monitored and the "flag". Between the limits of motion of the pivotal member, the rotation of the "flag", in effect, provides an analog read-out. Restated, in the patented device, an observer will make a judgment as to the level of the liquid being monitored by estimating the relative amounts of two colors, provided on different portions of the "flag", which are located behind a viewing window.

There are many applications where it is important to know, immediately and unambiguously, when the quantity of fluid in a reservoir has departed from a predetermined level. Thus, there has been a previously unsatisfied demand for a liquid level indicator which would be bi-stable in operation, i.e., the display of the indicator device would change from one state to a completely different state when the level of the liquid being monitored passes through a predetermined critical level.

SUMMARY OF THE INVENTION

The present invention overcomes the above-briefly discussed and other deficiencies and disadvantages of the prior art and, in so doing, provides a readily discernable indication that the level of a liquid being monitored has risen above or dropped below a critical level. The present invention also encompasses a novel and improved liquid level warning device which is characterized by bi-stable operation.

A liquid level indicator in accordance with a preferred embodiment of the invention comprises a housing which may, for example, be readily installed on existing equipment as a replacement for an existing indicator. The housing supports, at a first end thereof, a pivotally mounted fluid responsive actuator. This actuator comprises a float which is mechanically coupled, by means of an arm, to a holder which receives a magnet. The float is exposed to the liquid of interest, for example lubricating oil in a reservoir, and thus the position of the associated magnet relative to the housing will be determined by fluid induced movement of the float. The housing also defines a chamber in which an indicator or flag is pivotally supported. This chamber is fluidically isolated from that portion of the housing on which the actuator is mounted. The flag is part of a subassembly which also includes a magnet and is supported such that, in the absence of a retaining force, it will assume a first position under the influence of gravity. In this first position, a first colored portion of the flag will be disposed behind a viewing window. The housing is comprised of a non-magnetic material and the actuator and flag subassembly are supported such that they may be magnetically coupled. When this coupling is established, as a result of liquid induced movement of the float, a sufficiently strong force will be generated to cause the flag subassembly to pivot from the first position to a second position where a second color portion of the flag will be visible through the window. The strength and positioning of the magnets on the actuator and flag subassembly and the weight and balance of the flag subassembly are chosen such that the flag will be in either the first or second position.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the several figures and in which:

FIGS. 1A and 1B are, respectively, a cross-sectional side elevational view and a front view of a liquid level indicator in accordance with a first embodiment of the invention;

FIGS. 2A and 2B are, respectively, schematic side elevation and front views of the liquid level indicator of FIG. 1 in a first state.

DESCRIPTION OF THE DISCLOSED EMBODIMENT

Figure 3B:
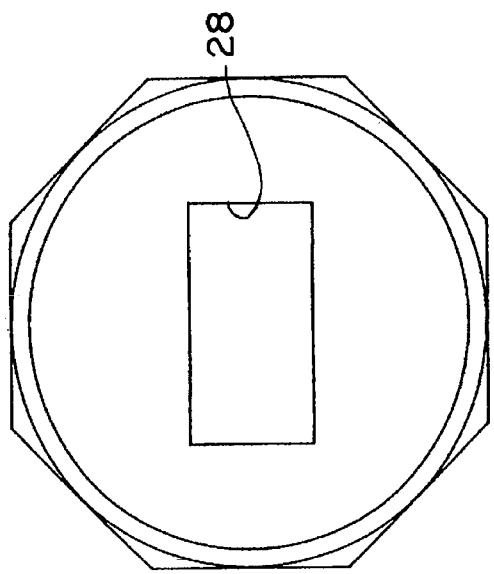
FIGS. 3A and 3B are, respectively, schematic side elevation and front views of the liquid level indicator of FIG. 1 in a second state.

With reference to FIGS. 1A and 1B, an indicator device in accordance with the present invention is indicated generally at 10. Indicator 10 includes a housing 12 comprised of a non-magnetic material. Housing 12 has a forward portion which defines a recess 14 in which a "flag" subassembly, indicated generally at 16, is located. Housing 12 also defines a second recess 18 in which an actuator subassembly, indicated generally at 20, is mounted. Recesses 14 and 18 are separated by a relatively thin partition or wall 22. The portion of housing 12 which defines the actuator recess 18 is configured, i.e., externally threaded as indicated at 24 in the disclosed embodiment, for mounting in or on the side of a reservoir which contains the liquid to be monitored.

Housing 12 is provided with a front cover 26 which defines a window 28. The cover 26, with its window 28, cooperates with recess 14 in housing 12 to define a chamber in which the flag subassembly 16 is pivotally supported. In the disclosed embodiment, a clear lens 30 is adhesively secured to the front of cover 26 so as to overlay the window 28.

The flag subassembly 16 includes a flag member 32 having an enlarged face portion which is juxtapositioned to the inside front face of cover 26. This enlarged forward portion of flag member 32, in the disclosed embodiment, has differently colored top and bottom face portions which are each at least as large as, and preferably exceed the size of, window 28. Thus, in the manner to be described below, either a first color or a second color will occupy the entire area of window 28. The flag subassembly 16 further comprises a magnet holder extension 34 of flag member 32. A first elongated permanent magnet 36, having opposite polarity ends, is secured to holder extension 34. The flag subassembly is mounted on, and thus pivots about, a first axle 38. Axle 38 is affixed to housing 12 and extends across recess 14. The bi-stable operational mode, to be described in greater detail below, dictates that the flag subassembly be balanced such that, under the influence of gravity, it will rotate about axle 38 to a first position determined by a stop shoulder 40 on housing 12. As will be obvious to those skilled in the art, the point of engagement of axle 38 with flag member 32 can be moved forwardly relative to the position shown in the disclosed embodiment so long as the same balance is maintained, i.e., the flag assembly will rotate in the clockwise direction under its own weight unless subjected to an external influence.

The actuator subassembly comprises a float 42 which contacts, and thus is influenced by, the liquid of interest. Float 42 is connected, by means of a bent arm 44, to a second magnet holder 46. Magnet holder 46 receives a second magnet 48, which may be identical to magnet 36, and is pivotal about a second axle 50. As the level of the liquid being monitored varies, the float 42 will move and thereby cause the magnet 48 to move along an arcuate path, in either a clockwise or a counterclockwise direction, as holder 46 pivots about axle 50. As the liquid level indicator is depicted in FIG. 1, a rising liquid level will result in float 42 causing magnet 48 to rotate through an arc in the clockwise direction. This rotation will bring a first end of magnet 48 into proximity with wall 22 and, in the embodiment being described, will orient the axis of magnet 48 substantially transverse to wall 22. Movement of magnet 48 to a position where it is approaches alignment with magnet 36 will, because of the coupling of the magnetic fields generated by the two magnets, cause a force to be exerted on the flag subassembly which will cause the flag subassembly to pivot in the counterclockwise direction about axle 38 and bring the axes of the two magnets substantially into alignment. Accordingly, that portion of the front face of flag member 32 which is disposed immediately behind window 28 will change. The rotation of the actuator subassembly in the counterclockwise direction may be stopped by contact between magnet holder 46 and an upper wall which in part defines the actuator recess 18 as shown in FIG. 1. Rotation of the actuator subassembly in the clockwise direction may be limited by contact between the magnet holder 46 and a stop shoulder which, in part, defines the recess 18.

FIGS. 2A and 2B respectively show the liquid level indicator of FIG. 1 in the low liquid level condition, i.e., in a first state. In this first state, the flag subassembly has pivoted under its own weight to a first position and the window 28 is "filled" with a first form of indicia. This indicia may, for example, be a first, solid color.

Figure 3A:
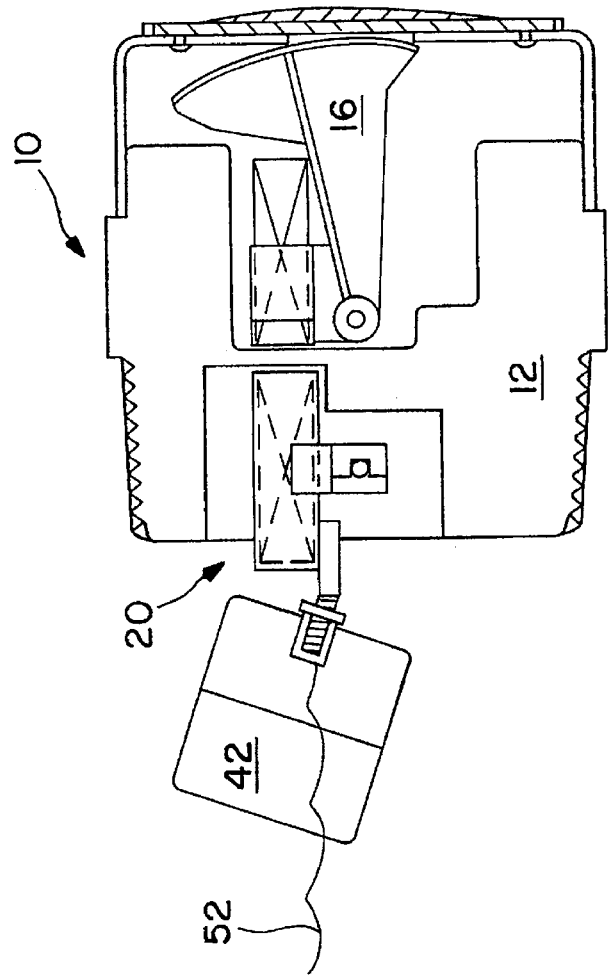

Referring to FIGS. 3A and 3B, when the level of the liquid being monitored rises to the point where the interaction between the liquid 52 and float 42 has caused the actuator subassembly to rotate about axle 50 to bring magnet 48 to its closest approach to wall 22, the magnetic coupling will cause the flag subassembly 16 to "snap" to the second state depicted in FIG. 3, i.e., the gravitational force on the flag will be overcome by an imposed magnetic force. The magnetic force resulting from the alignment of the two magnets with opposite poles thereof in juxtaposition will maintain the axial alignment between magnets 36 and 48. Accordingly, the second face portion of the flag member 32 will be in registration with window 28 and, in the example being described, the window will be filled with a second color as shown in FIG. 3B.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A bi-stable fluid level indicator comprising:

housing means, said housing means defining a pair of adjacently located, fluidically isolated recesses, said recesses each having an access opening;

flag means mounted within a first of said recesses for rotation about a first generally horizontal axis, said flag means including a first magnet, the weight of said flag means being unevenly distributed relative to said first axis wherein said flag means will rotate in a first direction under the influence of gravity, said flag means including at least a pair of discrete surface portions which bear distinctly different indicia;

means defining a viewing window in registration with said access opening of said housing means first recess, said window being commensurate in size and shape with one of said flag means surface portions, said flag means surface portions being positioned for viewing through said window;

first stop means affixed to said housing means for cooperating with said flag means to limit the rotation of said flag means in said first direction, said first stop means being positioned to define a first stable state of the indicator wherein a first of said indicia bearing surface portions of said flag means is in registration with said window; and actuator means in part disposed within the second of said recesses for movement in response to the level of a fluid which is to be monitored, said actuator means including:

an elongated arm, said arm having oppositely disposed first and second ends and being supported from said housing means for rotation about a second axis which is generally parallel to said first axis, said arm first end terminating within the second of said housing means recesses, said arm extending out of said second recess through the associated access opening;

float means attached to said second end of said arm, said float means being movable in response to contact with the fluid being monitored to thereby cause said arm to rotate about said second axis; and a second magnet affixed to said arm for movement therewith within said second recess, movement of said second magnet causing the spacing between said first and second magnets to vary as a function of the fluid induced position of said float means to thereby establish a variable magnetic coupling between said first and second magnets, said magnetic coupling causing a magnetic force of sufficient magnitude to cause said flag means to rotate in a second direction opposite to said first direction, said magnetic force beings exerted on said first magnet at a predetermined position of said float means, said magnetic force caused rotation of said flag means defining a second state of the indicator wherein the second indicia bearing surface portion of said flag means is in registration with said window.

2. The fluid level indicator of claim 1 wherein said arm is nonlinear.

3. The fluid level indicator of claim 1 further comprising: lens means mounted on said housing means so as to overlie said window.

4. The fluid level indicator of claim 1 wherein said first and second magnets each comprise an elongated permanent magnet having a pair of opposite poles, said magnets each defining an axis, the axes of said magnets being generally parallel when said indicator is in said second state.

5. The fluid level indicator of claim 4 wherein said flag means supports said first magnet for movement along an arcuate path during said rotational movement of said flag means and wherein said actuator means supports said second magnet for movement along an arcuate path during rotational movement of said arm, movement along said arcuate paths causing the spacing between said magnets to vary, rotation of said arm means in one direction resulting in opposite polarity ends of said magnets approaching one another wherein said magnetic force sufficient to cause said flag means to rotate in its said second direction is exerted on said first magnet.

6. The fluid level indicator of claim 5 further comprising: lens means mounted on said housing means so as to overlie said window.

7. The fluid level indicator of claim 6 wherein said arm is nonlinear.

8. The fluid level indicator of claim 6 further comprising second stop means for limiting the movement of said actuator means, and wherein the weight of said actuator means is distributed such that said arm will rotate in a direction which is opposite to said one direction to a position defined by said second stop means under the influence of gravity.

9. The fluid level indicator of claim 8 wherein said arm is nonlinear.

10. The fluid level indicator of claim 1 wherein said flag means supports said first magnet for movement along an arcuate path during said rotational movement of said flag means and wherein said actuator means supports said second magnet for movement along an arcuate path during rotational movement of said arm, movement along said arcuate paths causing the spacing between said magnets to vary, rotation of said arm means in one direction resulting in opposite polarity ends of said magnets approaching one another wherein said magnetic force sufficient to cause said flag means to rotate in its said second direction is exerted on said first magnet.

11. The fluid level indicator of claim 1 wherein the weight of said actuator means is distributed such that said arm will rotate in a direction which is opposite to said one direction under the influence of gravity.

* * * * *